United States Patent [19]
Flor et al.

[11] 3,794,419
[45] Feb. 26, 1974

[54] DUPLICATING MACHINE TO CONVERT MICROFILM TO MICROFICHE

[75] Inventors: Lawrence A. Flor, Anoka; Earl K. Hoyne, Fridley, both of Minn.

[73] Assignee: Minnesota Mining and Manufacturing Company, St. Paul, Minn.

[22] Filed: May 3, 1972

[21] Appl. No.: 250,040

[52] U.S. Cl. ................................. 355/91, 355/95
[51] Int. Cl. ............................................. G03b 27/20
[58] Field of Search ................. 355/91, 95, 96, 117

[56] References Cited
UNITED STATES PATENTS

| | | | |
|---|---|---|---|
| 3,667,845 | 6/1972 | Leavitt | 355/91 |
| 3,656,852 | 4/1972 | Oetting | 355/91 |
| 3,622,241 | 11/1970 | Dexter | 355/91 |
| 1,968,287 | 7/1934 | Farina | 355/96 |
| 2,222,961 | 11/1940 | Szasz | 355/117 |
| 3,313,225 | 4/1967 | Mears | 355/91 X |
| 2,947,233 | 8/1960 | Hickey | 355/95 |
| 1,471,672 | 10/1923 | Wehrli | 355/95 |
| 2,947,233 | 8/1960 | Hickey | 355/95 |
| 2,923,812 | 2/1960 | Hauptvogel | 240/1.3 |

*Primary Examiner*—John M. Horan
*Attorney, Agent, or Firm*—Alexander, Sell, Steldt & Delahunt

[57] ABSTRACT

A film exposing device for use in a machine to convert information on a strip of microfilm to information in the form of microfiche. The exposing device comprises a light source about which a rotary shutter is positioned. Light from the source is directed onto the strip of microfilm which is placed and held by air pressure and a resilient platen in intimate contact with a wide duplicating film advanced through the device in a direction normal to that of a strip.

7 Claims, 8 Drawing Figures

DUPLICATING MACHINE TO CONVERT MICROFILM TO MICROFICHE

BACKGROUND OF THE INVENTION

This invention relates to an improved microfilm duplicating machine for contact exposure of a duplicate film to a plurality of images on a strip of microfilm simultaneously from which duplicate film microfiche can be made. In one aspect this invention relates to an improved device for maintaining contact between a section of master film and a wide duplicate film stock during exposure and for permitting the rapid separation and relative movement of the master and duplicate stock in directions normal to each other and for again placing subsequent sections of the master and duplicate stock in contact.

DESCRIPTION OF THE PRIOR ART

There are prior duplicating machines for duplicating films, which machines have means for assuring that there is good contact between the films during exposure such that the duplicate stock has a latent image imparted thereto which is like the image of the master. Contact between the emulsion-coated faces of the master and duplicate stock are thus desired during exposure but the emulsion coated surfaces should otherwise be treated delicately to avoid scratching. In the prior art, glass plates have been utilized to force opposed film sections together. Also, a vacuum has been utilized to draw the air from between the films such that the two may be pressed into intimate contact at the exposing station. An example of the last-mentioned prior art is U.S. Pat. No. 3,606,536, wherein the master and duplicate stock are being advanced in the same relative direction. This system of using vacuum however is not useful in achieving contact between strips of films which are moving in paths normal to each other such as in the device of the present invention. The glass plates absorb heat and the movement of the plates is not convenient for rapid operation.

The presence of prior art where positive air pressure which is intermittently applied against the film to afford contact and to aid in separation is not known to the applicant. Additionally, the use of a platen behind the duplicate film through which air is directed against the film is not known in the prior art.

SUMMARY OF THE INVENTION

The above and other novel features are recited below. The purpose of the present invention is to afford means for changing the format of the microfilm information from 16 mm strips of microfilm to microfiche by using 105 mm duplicate stock film material and moving the strip of 16 mm microfilm in a direction normal to that of the 105 mm duplicate stock to impart to the duplicate stock a plurality of images from the 16 mm film and dispose the images in rows. Thus, information stored on magnetic tape may be converted by computer onto microfilm with existing electron beam recording equipment and with the apparatus of the present invention the 16 mm film can be converted to microfiche by exposing 105 mm duplicate stock film to successive sections of the microfilm to define transverse rows of images on the duplicate stock. The device of the present invention comprises means for supporting and transporting a strip of 16 mm microfilm through an exposure station. Means for supporting a supply of duplicate 105 mm film stock and transporting it along a path through the exposure station, through a developing station, and to rewind or cut the developed duplicate stock. The exposure station comprises guide members for supporting the duplicate film stock in a transverse position relative to the exposing station and to support a section of the 16 mm film in a position longitudinally of the exposure station and in apposed position to the 105 mm film. Force transfer means are provided for forcing the films into intimate contact. The force transfer means comprises duct means for directing air towards said opposed strips of film, and valve means are provided in the duct adjacent the support for the 105 mm film to effect a rapid movement of the film into contact and separation thereof at the exposure station. A platen behind the duplicate stock is in the path of the air and lifts the stock to reduce the spacing between the films. A longitudinal light source extending in a path parallel to the path of the 16 mm film affords exposure of the contacting films and exposure is controlled by a rotary shutter. The air used to afford contact between the films is also used to cool the films and guides, the air used to cool the light source is subsequently heated to a greater extent for the heat development of the duplicate stock.

DESCRIPTION OF THE DRAWING

The present invention will be more fully understood after reading the following detailed description which refers to the accompanying drawing wherein.

DESCRIPTION OF THE INVENTION

Figure 1:
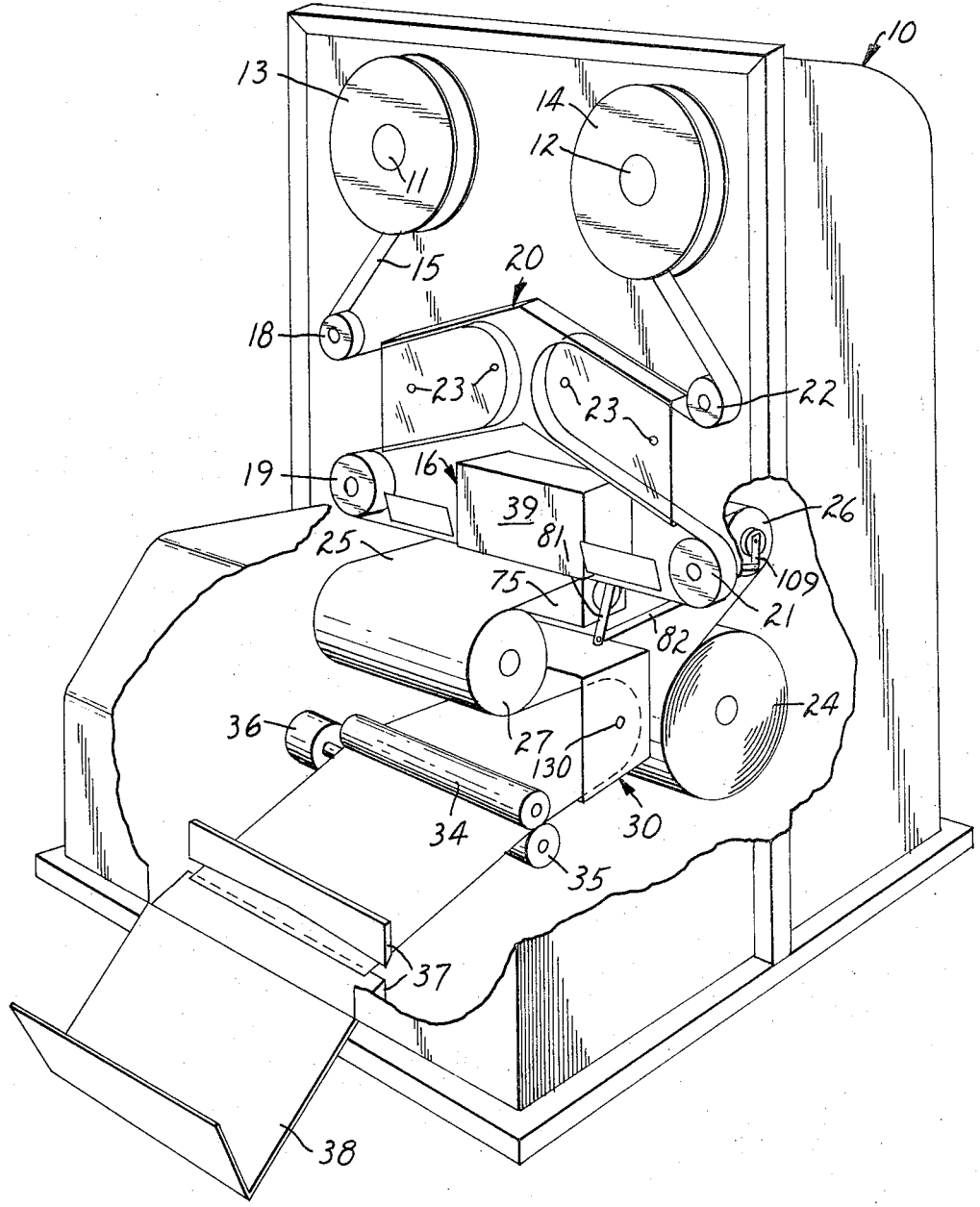
FIG. 1 is a schematic perspective view representing one embodiment of a machine according to the present invention.
Figure 2:
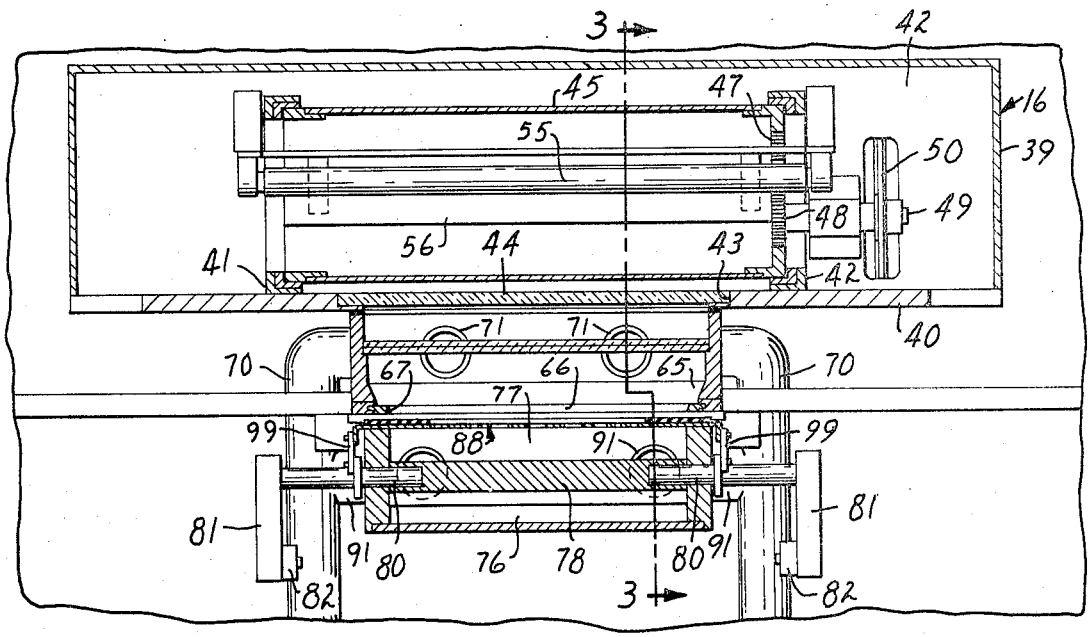
FIG. 2 is a longitudinal sectional view showing the exposure station of the device of FIG. 1.

The machine of the present invention affords the duplication of information on 16 mm strip microfilm into information on a microfiche format. The duplicate stock for the microfiche or 105 mm film is preferably a light sensitive heat developable film requiring brief intense radiation for exposure such that the machine may be daylight loaded and operated in room light.

The machine comprises a frame 10 which supports a pair of rotatable driven spindles 11 and 12 for supporting microfilm reels, 13 and 14 respectively, for supporting the master film 15. The master film 15 is threaded from the supply reel 13 through a film guide transport past the exposing station, generally designated 16, to the take-up reel 14.

The path for the master film 15 is from the supply reel 13 to a roller guide 18 and into a vacuum loop chamber 20 onto another guide roller 19. From the guide roller 19 the film passes through the exposing station 16 onto a film drive roller 21. The film 15 then returns into the loop storage chamber 20 from which it is drawn over a guide roller 22 and wound on the take-up reel 14 driven intermittently by spindle 12. The loop chamber 20 has openings 23 which sense the position of the film loop to actuate the drive motors for spindles 11 and 12.

The frame 10 also supports a supply roll 24 of duplicate film stock 25. The duplicate film stock 25 is 105 mm light-sensitive, preferably heat developable film such as the dry silver film sold by Minnesota Mining and Manufacturing Company, Saint Paul, Minn., under the brand name "3M", and described in U.S. Pat. No. 3,457,075.

The duplicate film 25 is fed by an intermittently driven film drive roller 26 from the supply roll 24 to the exposure station 16 along a path which is normal to that of the master film 15. From the exposure station the duplicate film 25 moves across a continuously driven heated roll 27 to develop the film. The film 25 is supported around the roller 27 by the heated air passing through the cylindrical surface of the roll. From the developing roll 27 the processed duplicate film 25 is drawn into a vacuum loop chamber 30 where it is cooled by air being drawn into the chamber. The film 25 is pulled from the chamber 30 under tension by a pair of opposed rollers 34 and 35. The roller 35 is driven by motor 36 controlled by a vacuum sensing switch associated with the chamber 30. The roller 35 is biased toward roller 35 to place the film in driving engagement with the driven roll 35. The film 25 is then directed between two cutting members 37 which cut the film into predetermined lengths in response to coded marks exposed onto the duplicate film stock. Alternatively the film 25, after it is processed and passed between the feed rollers 34 and 35, may be wound onto a take-up roll. The cut sections of developed film are dispensed into a tray 38 on the front of the machine.

The exposing station 16 comprises a housing 39 which is supported primarily on a plate 40 extending transversely or horizontally at the exposure station. A pair of parallel spaced support members 41 and 42, spaced on either side of an opening 43 in the plate 40, are mounted on plate 40. A heat-absorbing glass plate 44 is positioned in the opening 43. The support members 41 and 42 have bushings in large openings to rotatably support a generally cylindrical shutter 45 which extends between the support plates 41 and 42. The shutter 45 has a hub 46 at the end adjacent the support 42. The hub 46 is provided with interior gears 47 which mesh with a gear 48 supported also by the plate 42 via a shaft 49 and driven by a timing belt 50 from a drive sprocket 51 of a motor 52.

Also supported between the support plates 41 and 42 is an elongate light source comprising a mercury vapor lamp 54 and a pair of parabolic reflectors 55 and 56. The lamp 54 is disposed on the center line of each reflector and the reflectors 55 and 56 are rotated about their focus or the lamp axis about 10° to direct reflected light therefrom toward the same band of film. The light from the source passes through a heat absorbing glass 44 supported in the opening 43 of the plate 40. The shutter 45 is provided with diametrically opposed openings 53. The shutter 45 is rotated to place an opening 53 at an exposing position, at which time a timer controls exposure and then the opening is moved past the open position to discontinue film exposure.

The housing 39 is cooled by drawing ambient air through the ends of the housing and about the light source through the openings in support members 41 and 42. The cooling air is exhausted from the housing 39 through a manifold 57 disposed on the rearward side of the housing 39, which manifold connects with a duct 58 leading to a blower 120 to be hereinafter described.

The exposing station 16 is formed with force transfer means utilizing forced air for pressing the films into intimate contact. This means comprises a rectangular frame 59 defining a first air pressure chamber 60 suspended beneath the housing 39. The chamber 60 is positioned above the path of the films 15 and 25. The frame 59 is positioned transversely of the machine, parallel to the housing 39 and extends in the direction of the path of the master film 15. Forced air is also directed against the opposite side of the film as hereinafter described.

Within the chamber 60 is disposed means for controlling the exposing light. As illustrated in FIGS. 3, 5, 6 and 7 this control means comprises a pair of glass plates 61 and 62. Between these glass plates is positioned a thin sheet 63 of polyester film vapor coated with aluminum to reduce light transmission by about 35 percent. This sheet will decrease the intensity of the light on the side opposite the lamp 54, particularly at the center section of the exposing station such that exposure of the duplicate film will be uniform from end to end. The thin polyester sheet 63 may have slightly different shapes than illustrated in FIG. 5 to provide the light control required. Other means for light control to afford an even distribution of the light through an exposure opening 65 in the bottom of the frame 59 and an opening 66 in a masking plate 67, which is slidably received beneath the frame 58, may also be substituted for the control member illustrated. The opening 66 in the masking member 67 is narrower than the width of the master film 15 and the opening 66 has a length which permits light to pass therethrough and expose simultaneously a desired number of images on the section of master film 15. The bottom surface of the mask 67 is polished to provide a smooth surface to contact the backing of the master film.

The force transfer means further includes an air duct 70 connected to the frame 59 and air moves through the duct 59 under a predetermined pressure and into the chamber 60 to pass downward through the openings 65 and 66 toward the master film 15 for purposes which will hereinafter be explained. The duct 70 may comprise two branches extending up on either side of the frame 59 and via two openings 71 communicates with the interior of the chamber 60.

Figure 3:
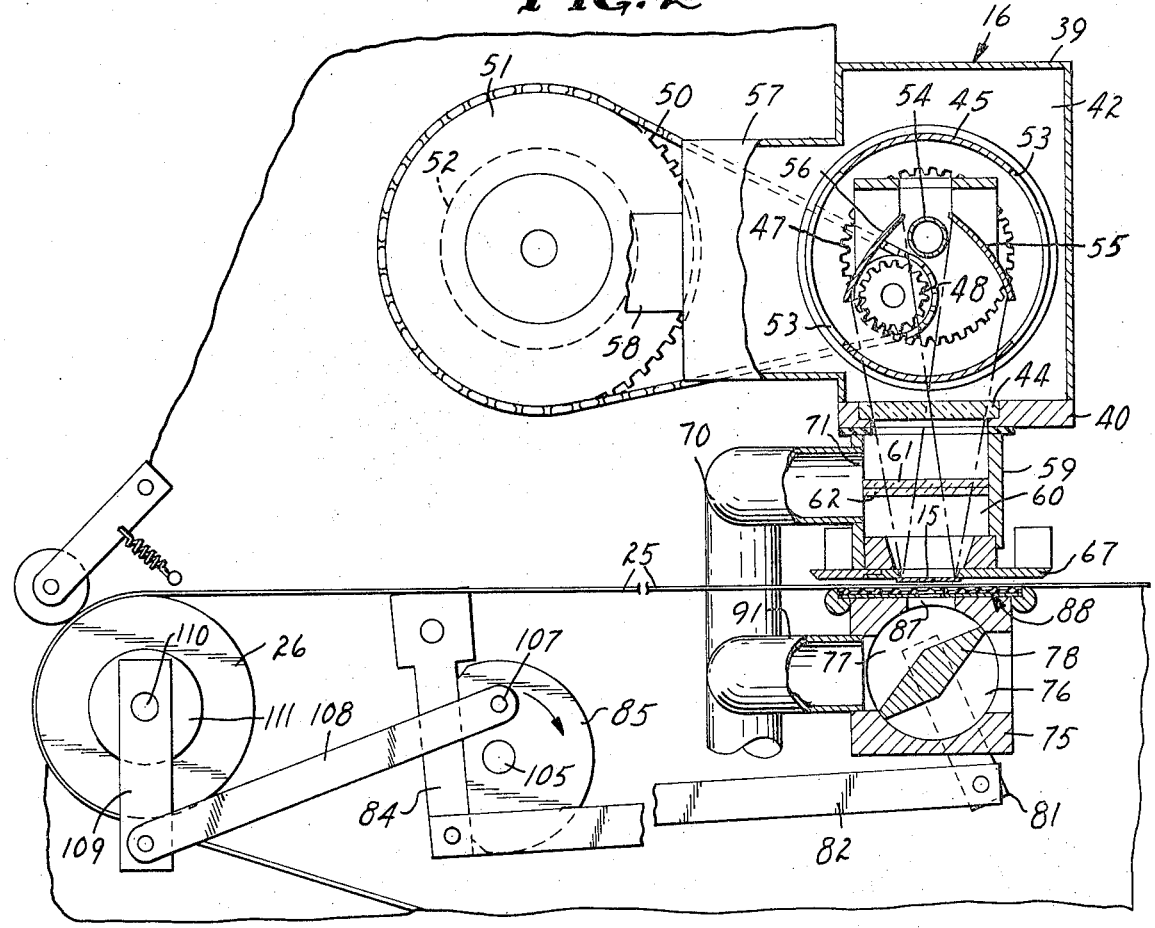
FIG. 3 is a transverse sectional view of the exposure station of FIG. 2 taken along the line 3—3.
Figure 6:
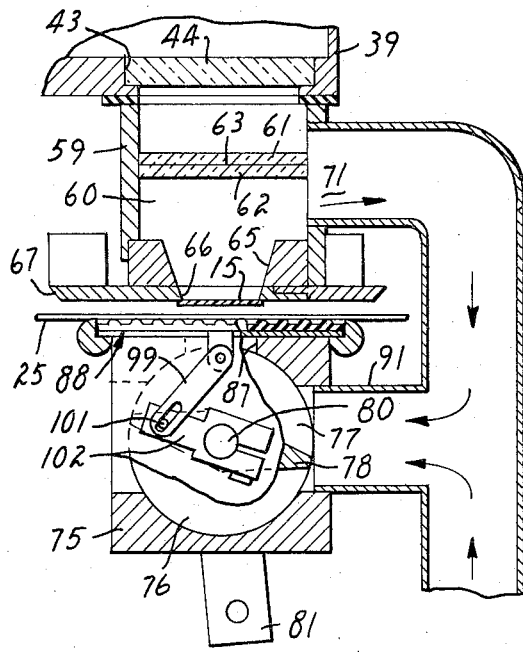
FIGS. 6 and 7 are detail view partly in section showing the film control members in alternate positions.
Figure 7:
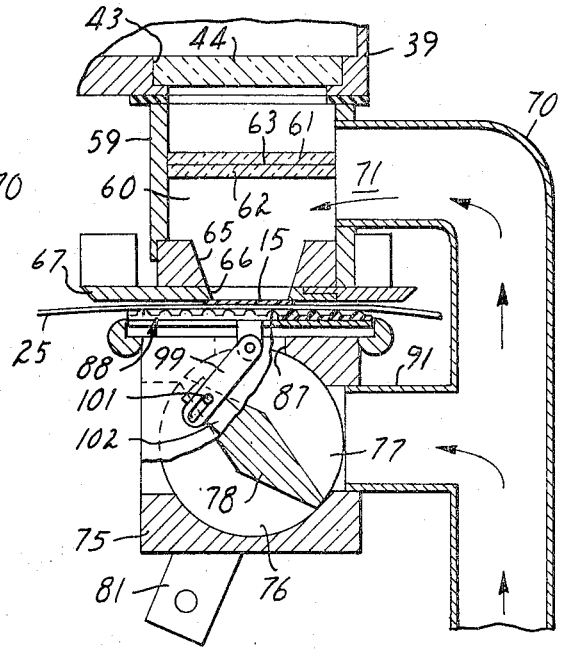

Supported by the frame 10 beneath the frame 59 is a rectangular block or second frame 75 having a longitudinal bore 76 formed therein to define a second pressure chamber 77 and an air passageway. Within the central bore 76 is a valve or rotatable vane 78 which in one position helps define the pressure chamber 77. The vane 78 is generally diamond-shaped in cross-section and fits diametrically within said bore and is rotatable on a shaft 80 extending through the transversely spaced ends of block 75. The shaft 80 is connected at each extended end to a radial arm 81, which arms are oscillated by links 82 (only one of which is shown) connected to pivoted cam following driving links 84. The links 84 are oscillated in response to rotation of two spaced cams 85, again only one is shown and will hereinafter be referred to singularly. Rotation of the cam 85 pivots the driving link 84 to move the vane 78 between a first operative pressure transferring position, as shown in FIGS. 3 and 7 where forced air is directed into the bore 76 and through an elongated slot 87 toward a platen 88 and the duplicate film 25, and a second position wherein the vane 78 is positioned generally horizontally in the path of the air and permits the air to pass through the block 75 and out through a second slotted opening 90 in the front side. The pressurized air is forced into the bore 76 through openings in the block 75 and through ducts 91 which branch from the air duct 70. In the forced air releasing or second position the vane 78, because of its shape will reduce below normal the pressure on the underside of the duplicate film 25, drawing it down on the block 75.

The platen 88 comprises a thin sheet metal plate 94 which is rectangular in shape and formed with an extension 95 on each end thereof having a depending leg 96. The plate 94 is formed with a series of openings 97 positioned centrally and spaced lengthwise through which the pressurized air can pass. The center-most openings 97 are larger than the openings toward the ends to place the pressure first against the center of the apposed films. The upper surface of the plate 94 is a flat black color. Disposed above and covering the plate 94 is a black silicone rubber pad having a plurality of longitudinally extending ridges which form paths for the air moving through holes 97 when the platen 88 has been lifted into contact with the duplicate film 25. The air moving between the ridges cools the film. The pattern of the holes 97, as illustrated in FIG. 7, permits the air to first move through the large openings in the center portion of the plate to lift the film stock 25 against the master film 15 and to squeeze the air from between the center of the films first and then toward the ends as the contact is made. The platen 88 is raised by arms 99 which are connected to the depending legs 96 on the extensions 95. The arms 99 raise the platen upon movement of the vane 78 from the second position shown in FIG. 6 to the operating or first position of FIGS. 3 and 7. Movement of the platen 88 into contact with the film 25 precedes the final movement of the vane 78 to a position where the air pressure forces the films together. The platen 88 lifts the duplicate film 25 to reduce the spacing between the films and between the duplicate film 25 and the mask 67. The platen 88 is lifted by the arms 99 which are connected to and driven by eccentric pins 101 on crank arms 102. The crank arms 102 are secured to the extended ends of shaft 80.

Upon movement of the vane 78 to its second position the pressure of the air is relieved from the film very rapidly. The pressure applied against the film 15 through chamber 60 is not released as rapidly and the reserve pressure in chamber 60 forces the film away from contact with the mask 67, and the air blows around the edges of the film 15 forcing the wider film 25 away from the film 15 causing a rapid separation of the two films due to this air flow as the platen 88 is lowered. The reduced pressure below the film 25 increases the speed of separation.

The cam 85 for operating the vane 78 is secured to a motor drive shaft 105 of a single revolution drive motor not shown. Connected also to the drive shaft 105 is an eccentrically positioned drive pin 107 which drives a link 108 connected to a crank arm 109. Crank arm 109 is connected to a drive shaft 110 of a single direction needle-bearing clutch 111. The clutch 111 is connected to the shaft which supports and drives the film drive roller 26, feeding the duplicate film 25 incrementally from the supply roll 24 to the exposure station 16. Thus rotation of the shaft 105 by its single revolution drive motor through the first one-quarter of a revolution moves the vane 78 from the operating position of FIGS. 3 and 7 wherein air pressure is applied against the film, to an open valve position, releasing the air pressure against the films and separating them. The next one-half revolution of shaft 105 drives the crank arm 109 to rotate roller 26 a predetermined increment to advance the film 25 a distance equivalent to one row of images on the resulting fiche. The last one-quarter turn of the shaft 105 returns the vane 78 to the operative position of FIGS. 3 and 7, again forcing the films into intimate contact at the exposure station. In the interim, the machine has driven roller 21 to advance the master film 15 and place a new section of film over the opening 66. The film advance for film 15 can be programmed by codes on the film, counting image frames etc. Control members of any suitable design can be utilized to operate the drive roller 21 and to program the advance of the duplicate stock after the desired number of latent images or rows of images have been imparted to a length of the film.

With the films in intimate contact at the exposure station due to the initial air pressure and the pressure of the platen 88 the motor 52 drives the shutter 45 to rotate the shutter one-half revolution exposing the duplicate film 25 to a light image projected through the master film 15.

Figure 8:
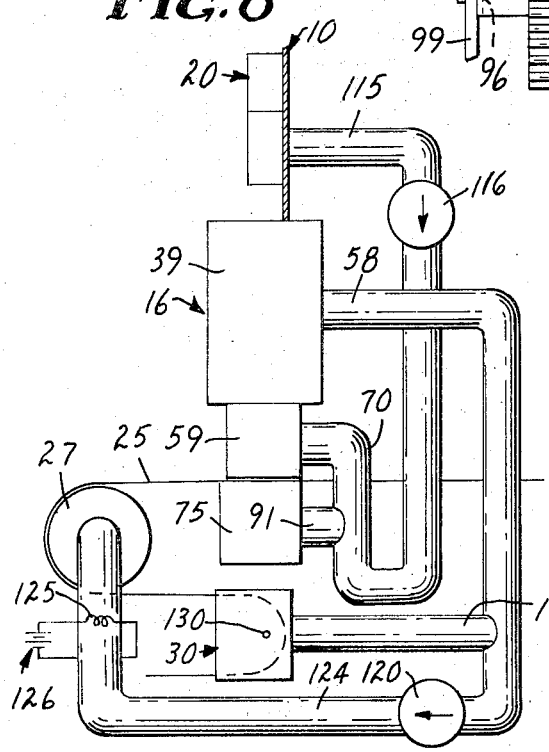
FIG. 8 is a schematic view of the air flow system on the device of FIG. 1.
Figure 4:
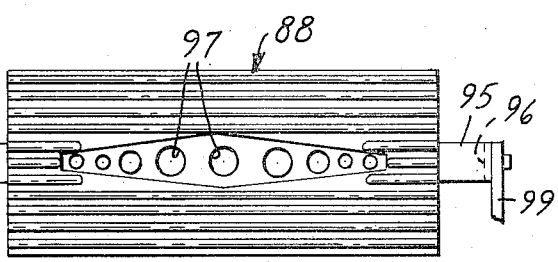
FIG. 4 is a detail view of a movable platen.
Figure 5:
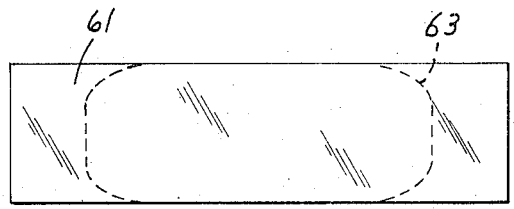
FIG. 5 is a detail view of a light control shield.

Referring now to FIG. 8 there is shown a schematic diagram of the air flow system for the machine. This figure illustrates that a manifold or duct 115 is positioned to cover the openings 23 in the vacuum loop chamber 20. The duct 115 draws air into the vacuum chamber under the pressure of a centrifugal multiple stage blower 116 positioned in the duct 115. The air introduced into the duct 115 is cool ambient air which surrounds the machine and this air is blown by the blower 116 under a pressure of 3 to 6 inches of water and approximately 20 cubic feet of air per minute, through the duct 70 and branches thereof such as 91 into the chamber 60 and into the bore 76. This ambient air introduced into these chambers is thus cool and serves to cool the films 15 and 25 and to cool the surrounding portions of the frame 59 and 75. The air duct 58 on housing 39 is connected to a centrifugal multiple-stage blower 120. Also connected to the blower 120 is a duct 121 which is connected to the film cooling chamber 30. Air drawn through the housing 39 and air duct 59 to cool the lamp and surrounding reflector, shutter and housing, together with the air drawn into cooling chamber 30 which cools the heated film, is forced by flow 120 through a duct 124 past a heating element 125 into the developing roll 27. This warmed air is thus heated additionally by the heating element 25 connected to a source of electrical energy 126 to bring the air to a temperature sufficient to heat develop the film 25. The air is also moved by the blower 120 at an air flow speed of about 30 cfm or 6 inches of water vacuum or pressure. The heating roller 27 is formed of sintered bronze or sintered ceramic through which the forced hot air may pass generally uniformly to heat the film in the area the film extends about the drum periphery. This air flow is sufficient to provide the necessary cooling of the lamp 54 and film 25 and to provide the necessary heating for development and air support for the film 25 as it is drawn under tension developed by air flow in the vacuum loop chamber 30 around the developing roller 27. A vacuum sensing switch is connected to an opening 130 to sense the position of the film loop in the chamber 30 and to control the operation of motor 36. Motor 36 and rollers 34 and 35 draw the cooled film 25 from the loop chamber 30.

The machine of the present invention affords the production of microfiche without destruction of the master film. The master can thus be retained in its strip form for further use or for further production of additional copies on the microfiche format. The present machine places the master film over the duplicate film to expose a column at a time of the resulting microfiche each time an exposure is made. The master film, when developed by the electron beam recorder, is provided with a code on its margin to control the advance of the film 15 by drive roller 21. The machine of the present invention places the coded marks on the duplicate film 25 by counting the number of times the duplicate film is advanced in succession, said number corresponding with the number of columns across a microfiche.

Having thus described the present invention with references to one embodiment of a machine constructed according to this invention, it will be readily understood that changes may be made in the machine without departing from the spirit or scope of this invention as defined by the appended claims.

What is claimed is:

1. A microfilm duplicating apparatus form forming microfiche with rows of images running transverse of the duplicate film from a strip of film having successive visible images along the length thereof comprising:

a film transport means for intermittently advancing a said strip of film along a first path, an exposure station disposed along said path for exposing a section of said strip of film which section comprises a plurality of images, means for supporting a supply of duplicate film having a width at least as great as the length of said section of film, means for intermittently advancing said duplicate film along a second path perpendicular to said first path and through said exposure station in a position opposed to that of said section of film, force transfer means at said exposure station for forcing said films into intimate contact with each other at said exposure station, said force transfer means comprising:

a source of air under pressure, duct means for directing said air under pressure to a first chamber position above a said section of film and to a second chamber below said duplicate film, a platen movably supported below said duplicate film and above said second chamber for movement toward and away from said duplicate film, and valve means in said second chamber for directing said air coming therein toward said platen and said duplicate film to force said duplicate film toward and into intimate contact with said section of film and for releasing said air pressure from said platen and duplicate film allowing the air pressure to exhaust to the atmosphere and the iar applied against said section of film will aid in separating said suplicate film from the section of film to permit the subsequent intermittent advancement of said films along said perpendicular paths, a source of brief intense radiation at said exposure station for directing radiation through said first chamber for exposing said duplicate film to images on said section of film, processing means for developing the exposed duplicate film, and means for transferring the exposed film to said processing means for developing the film.

2. The apparatus of claim 1 wherein said source of radiation comprises:

a rectangular housing extending along the path of said strip of film above said first chamber, a source of light disposed within said housing, rotatable shutter disposed about said source of light, said shutter comprising a generally cylindrical-shaped member having at least on opening formed in the side wall and extending axially of said member, and means rotatably supporting said shutter for rotation about said source of light for controlling the exposure of successive sections of film.

3. The apparatus according to claim 2 wherein said processing means for said duplicate film includes a continuously rotatable drum through which heated air under pressure is directed against said duplicate film after exposure with sufficient temperature and pressure to heat said duplicate film and maintain the duplicate film in spaced relation from the surface of said drum.

4. The apparatus according to claim 1 wherein said platen comprises a plate having a plurality of spaced central openings and means are connected to said plate for raising said plate upon operation of said valve means to direct air toward said duplicate film, which means comprises a crank arm for moving said plate upon operation of said valve means.

5. A contact film exposing apparatus for forcing two opposed films into intimate contact, exposing a duplicate film to images on a section of the other film and separating the films, comprising:

a rectangular housing extending along a path of said section of film, a source of light disposed within said housing, support means for said section of film and for said one duplicate film, a first air chamber disposed adjacent said section of film, a second chamber disposed adjacent said duplicate film, means for directing air under pressure into said chambers to force said films into intimate contact with each other, valve means in said second chamber for relieving the air pressure on said duplicate film and then on said section of film such that said pressure is first relieved from said duplicate film and the pressure against said strip of film will aid in separating said films to afford the rapid advance of said films another increment, and platen means placed adjacent the duplicate film for moving the duplicate film toward the section of film, said platen means comprising:

a thin plate formed with a plurality of spaced central openings positioned lengthwise of said plate, and a silicone rubber cover on said plate, said cover having parallel ridges on the upper surface with said ridges extending lengthwise of said plate over areas of said plate surrounding said openings, and means connected to said plate affording movement of said plate toward and away from said duplicate film.

6. The apparatus according to claim 5 wherein said means connected to said plate comprises a crank arm for moving said plate upon operation of said valve means.

7. The apparatus according to claim 6, wherein said valve means comprises an oscillating vane disposed in said second chamber, said second chamber being defined by a bone disposed lengthwise through a block disposed beneath the path of said section of film, said block also having an air inlet opening, an outlet opening and a force directing opening over which said plate is disposed, said vane directing air entering said inlet opening to one of said outlet opening or force directing opening upon movement thereof.

* * * * *